US012205599B2

(12) United States Patent
Lee et al.

(10) Patent No.: US 12,205,599 B2
(45) **Date of Patent: *Jan. 21, 2025**

(54) APPARATUS FOR ENCODING AND DECODING OF INTEGRATED SPEECH AND AUDIO

(71) Applicants: ELECTRONICS AND TELECOMMUNICATIONS RESEARCH INSTITUTE, Daejeon (KR); Kwangwoon University Industry-Academic Collaboration Foundation, Seoul (KR)

(72) Inventors: Tae Jin Lee, Daejeon (KR); Seung-Kwon Baek, Chungcheongbuk-do (KR); Min Je Kim, Daejeon (KR); Dae Young Jang, Daejeon (KR); Jeongil Seo, Daejeon (KR); Kyeongok Kang, Daejeon (KR); Jin-Woo Hong, Daejeon (KR); Hochong Park, Seoul (KR); Young-Cheol Park, Seoul (KR)

(73) Assignees: ELECTRONICS AND TELECOMMUNICATIONS RESEARCH INSTITUTE, Daejeon (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/212,364

(22) Filed: Jun. 21, 2023

(65) Prior Publication Data

US 2024/0119948 A1 Apr. 11, 2024

Related U.S. Application Data

(63) Continuation of application No. 16/925,946, filed on Jul. 10, 2020, now Pat. No. 11,705,137, which is a (Continued)

(30) Foreign Application Priority Data

Jul. 14, 2008 (KR) ........................ 10-2008-0068369
Dec. 26, 2008 (KR) ........................ 10-2008-0134297
Jul. 7, 2009 (KR) ........................ 10-2009-0061608

(51) Int. Cl.
*G10L 19/008* (2013.01)
*G10L 19/02* (2013.01)

(Continued)

(52) U.S. Cl.
CPC ............ *G10L 19/008* (2013.01); *G10L 19/02* (2013.01); *G10L 19/04* (2013.01); *G10L 19/12* (2013.01); *G10L 19/20* (2013.01); *G10L 19/00* (2013.01)

(58) Field of Classification Search
USPC ......................... 704/205, 213, 216, 500–504
See application file for complete search history.

(56) References Cited

U.S. PATENT DOCUMENTS 5,649,055 A 7/1997 Gupta
6,134,518 A 10/2000 Cohen et al.

(Continued)

FOREIGN PATENT DOCUMENTS

EP 0932141 A2 7/1999
JP 7-38437 2/1995

(Continued)

OTHER PUBLICATIONS

Schuijers et al., "Low complexity parametric stereo coding", Audio Engineering Society, Convention Paper 6073, Berlin, Germany, May 2004, pp. 1-11.

(Continued)

*Primary Examiner* — Leonard Saint-Cyr
(74) *Attorney, Agent, or Firm* — STAAS & HALSEY LLP

(57) ABSTRACT

Provided is an encoding apparatus for integrally encoding and decoding a speech signal and a audio signal, and may include: an input signal analyzer to analyze a characteristic of an input signal; a stereo encoder to down mix the input signal to a mono signal when the input signal is a stereo signal, and to extract stereo sound image information; a frequency band expander to expand a frequency band of the input signal; a sampling rate converter to convert a sampling rate; a speech signal encoder to encode the input signal using a speech encoding module when the input signal is a speech characteristics signal; a audio signal encoder to encode the input signal using a audio encoding module when the input signal is a audio characteristic signal; and a bitstream generator to generate a bitstream.

18 Claims, 5 Drawing Sheets

Related U.S. Application Data continuation of application No. 16/557,238, filed on Aug. 30, 2019, now Pat. No. 10,714,103, which is a continuation of application No. 15/810,732, filed on Nov. 13, 2017, now Pat. No. 10,403,293, which is a continuation of application No. 14/534,781, filed on Nov. 6, 2014, now Pat. No. 9,818,411, which is a continuation of application No. 13/003,979, filed as application No. PCT/KR2009/003855 on Jul. 14, 2009, now Pat. No. 8,903,720.

(51) Int. Cl.

| | |
|---|---|
| ***G10L 19/04*** | (2013.01) |
| ***G10L 19/12*** | (2013.01) |
| ***G10L 19/20*** | (2013.01) |
| *G10L 19/00* | (2013.01) |

(56) References Cited

U.S. PATENT DOCUMENTS

| | | | |
|---|---|---|---|
| 6,484,137 B1 | 11/2002 | Taniguchi et al. | |
| 7,222,070 B1 | 5/2007 | Stachurski et al. | |
| 7,392,176 B2 | 6/2008 | Nishio et al. | |
| 8,108,220 B2 | 1/2012 | Saunders et al. | |
| 8,781,843 B2 * | 7/2014 | Oh | G10L 19/20 704/E19.041 |
| 2002/0040295 A1 | 4/2002 | Saunders et al. | |
| 2003/0101050 A1 * | 5/2003 | Khalil | G10L 19/22 704/E19.041 |
| 2003/0125933 A1 | 7/2003 | Saunders et al. | |
| 2005/0055204 A1 | 3/2005 | Florencio et al. | |
| 2007/0106502 A1 | 5/2007 | Kim et al. | |
| 2007/0174063 A1 | 7/2007 | Mehrotra et al. | |
| 2007/0208565 A1 | 9/2007 | Lakaniemi et al. | |
| 2007/0238415 A1 | 10/2007 | Sinha et al. | |
| 2008/0004883 A1 | 1/2008 | Vilermo et al. | |
| 2008/0010062 A1 | 1/2008 | Son et al. | |
| 2008/0031463 A1 | 2/2008 | Davis | |
| 2008/0059160 A1 | 3/2008 | Saunders et al. | |
| 2008/0077412 A1 | 3/2008 | Oh et al. | |
| 2008/0114605 A1 | 5/2008 | Wu et al. | |
| 2008/0114608 A1 | 5/2008 | Bastien | |
| 2008/0147414 A1 | 6/2008 | Son | |
| 2008/0162121 A1 | 7/2008 | Son | |
| 2008/0312914 A1 * | 12/2008 | Rajendran | G10L 19/18 704/211 |
| 2008/0319739 A1 | 12/2008 | Mehrotra et al. | |
| 2009/0164223 A1 | 6/2009 | Fejzo | |
| 2010/0114565 A1 * | 5/2010 | Kinns | G10L 19/005 704/201 |

FOREIGN PATENT DOCUMENTS

| | | |
|---|---|---|
| JP | 8-97726 | 4/1996 |
| JP | 11-175098 | 7/1999 |
| JP | 2000-232368 | 8/2000 |
| JP | 2005-99243 | 4/2005 |
| JP | 2005-107255 | 4/2005 |
| JP | 2006-325162 | 11/2006 |
| JP | 2007-525707 | 9/2007 |
| JP | 2007-531027 | 11/2007 |
| JP | 2009-524846 | 7/2009 |
| JP | 2013-232007 | 11/2013 |
| JP | 2014-139674 | 7/2014 |
| KR | 10-0614496 | 8/2006 |
| WO | 2005-099243 A1 | 10/2005 |
| WO | 2007/083934 | 7/2007 |
| WO | 2007/086646 | 8/2007 |
| WO | 2008/060114 A1 | 5/2008 |
| WO | 2008/072913 A1 | 6/2008 |

OTHER PUBLICATIONS

Kim et al., "Improved Frame Mode Selection for AMR-WB+ Based on Decision Tree", IEICE Transactions on Information and Systems, vol. E91-D, No. 6, Jun. 2008, pp. 1830-1833.
Sang-Wook Shin et al., "Designing a Unified Speech/Audio Codec by Adopting a Single Channel Harmonic Source Separating Module", School of Electrical and Electronic Engineering, Yonsei University, Korea, 2008, pp. 185-188.
Jonas Engdegård et al., "Audio Engineering Society Convention Paper: Synthetic Ambience in Parametric Stereo Coding", May 8-11, 2004, Berlin, Germany, pp. 1-12.
Redwan Salami et al., "Extended AMR-WB for High-Quality Audio on Mobile Devices", pp. 90-97.
International Search Report for PCT/KR2009/003855 mailed on Oct. 30, 2009.
USPTO Office Communication issued Sep. 9, 2014 in U.S. Appl. No. 13/003,979 acknowledging the IDS filed Aug. 6, 2014.
Notice of Allowance and Fee(s) mailed Jul. 31, 2014 in U.S. Appl. No. 13/003,979.
Office Action issued Mar. 21, 2014 in U.S. Appl. No. 13/003,979.
Office Action issued Dec. 11, 2013 in U.S. Appl. No. 13/003,979.
Office Action issued Jul. 15, 2013 in U.S. Appl. No. 13/003,979.
"*AMR-WB+: a New Audio Coding Standard for 3rd Generation Mobile Audio Services*"; Jari Makinen et al.; Multimedia Technologies Laboratory, Nokia Research Center, Finland; VoiceAge Corp., Montreal, Qc, Canada; University of Sherbrooke, Qc, Canada; Multimedia Technologies, Ericsson Research, Sweden; ICASSP 2005; (4 pages).
Extended European Search Report dated Apr. 2, 2019 in related European Patent Application No. 18215268.6 (8 pages).
Dietz et al: "*Spectral Band Replication, a novel approach in audio coding*"; Audio Engineering Society Convention P, New York, NY, US, vol. 112, No. 5553, May 10, 2002 (May 10, 2002), pp. 1-08, XP009020921.
Non-Final Office Action dated Feb. 18, 2015 in parent U.S. Appl. No. 14/534,781.
Final Office Action dated Jul. 21, 2015 in parent U.S. Appl. No. 14/534,781.
Non-Final Office Action dated Dec. 16, 2015 in parent U.S. Appl. No. 14/534,781.
Advisory Action dated Sep. 29, 2015 in parent U.S. Appl. No. 14/534,781.
Final Office Action dated Jun. 2, 2016 in parent U.S. Appl. No. 14/534,781.
Non-Final Office Action dated Sep. 29, 2016 in parent U.S. Appl. No. 14/534,781.

(56) References Cited

OTHER PUBLICATIONS

Advisory Action dated Aug. 15, 2016 in parent U.S. Appl. No. 14/534,781.
Final Office Action dated Apr. 24, 2017 in parent U.S. Appl. No. 14/534,781.
Notice of Allowance mailed Jul. 14, 2017 in parent U.S. Appl. No. 14/534,781.
US Office Action dated Jun. 15, 2018 in U.S. Appl. No. 15/810,732.
US Office Action dated Dec. 28, 2018 in U.S. Appl. No. 15/810,732.
US Advisory Action dated Mar. 15, 2019 in U.S. Appl. No. 15/810,732.
US Notice of Allowance dated Apr. 25, 2019 in U.S. Appl. No. 15/810,732.
US Notice of Allowance dated Mar. 17, 2020 in U.S. Appl. No. 16/557,238.
European Communication dated Apr. 20, 2021 in European Patent Application No. 18215268.6.
Office Action dated Sep. 12, 2022 in parent U.S. Appl. No. 16/925,946.
Notice of Allowance dated Mar. 2, 2023 in parent U.S. Appl. No. 16/925,946.
U.S. Appl. No. 16/925,946, filed Jul. 10, 2020, Tae Jin Lee, et al., Electronics and Telecommunications Research Institute and Kwangwoon University Industry-Academic Collaboration Foundation.
U.S. Appl. No. 16/557,238 (now U.S. Pat. No. 10,714,103) , filed Aug. 30, 2019, Tae Jin Lee, et al., Electronics and Telecommunications Research Institute and Kwangwoon University Industry-Academic Collaboration Foundation.
U.S. Appl. No. 15/810,732 (now U.S. Pat. No. 10,403,293), filed Nov. 13, 2017, Tae Jin Lee, et al., Electronics and Telecommunications Research Institute and Kwangwoon University Industry-Academic Collaboration Foundation.
U.S. Appl. No. 14/534,781 (now U.S. Pat. No. 9,818,411), filed Nov. 6, 2014, Tae Jin Lee, et al., Electronics and Telecommunications Research Institute and Kwangwoon University Industry-Academic Collaboration Foundation.
U.S. Appl. No. 13/003,979 (now U.S. Pat. No. 8,903,720), filed Jan. 13, 2011, Tae Jin Lee, et al., Electronics and Telecommunications Research Institute and Kwangwoon University Industry-Academic Collaboration Foundation.

* cited by examiner

FIG. 3

300

| | FREQUENCY BAND (kHz) | |
|---|---|---|
| BITRATE(kbps) | START FREQUENCY BAND | STOP FREQUENCY BAND |
| 12 | 4.125 | 13.125 |
| 16 | 4.125 | 13.125 |
| 20 | 4.875 | 15.375 |
| 24 | 6.000 | 15.375 |
| 32 | 6.750 | 16.875 |
| 64 | 10.125 | 22.125 |

FIG. 4

400

| BITRATE(kbps) | | 12 | 16 | 20 | 24 | 32 | 64 |
|---|---|---|---|---|---|---|---|
| MONO | SPEECH ENCODING MODULE | ON | ON | ON | ON | ON | OFF |
| | FREQUENCY BAND EXPANSION MODULE | ON | ON | ON | ON | ON | ON |
| | STEREO ENCODING MODULE | OFF | OFF | OFF | OFF | OFF | OFF |
| | AUDIO ENCODING MODULE | OFF | OFF | ON | ON | ON | ON |
| STEREO | SPEECH ENCODING MODULE | ON | ON | ON | ON | ON | OFF |
| | FREQUENCY BAND EXPANSION MODULE | ON | ON | ON | ON | ON | ON |
| | STEREO ENCODING MODULE | ON | ON | ON | ON | ON | ON |
| | AUDIO ENCODING MODULE | OFF | OFF | OFF | ON | ON | ON |
| INPUT SIGNAL ANALYSIS MODULE | MONO | OFF | OFF | ON | ON | ON | OFF |
| | STEREO | OFF | OFF | OFF | ON | ON | OFF |

500

APPARATUS FOR ENCODING AND DECODING OF INTEGRATED SPEECH AND AUDIO

CROSS REFERENCE TO RELATED APPLICATIONS

This application is a continuation of U.S. patent application Ser. No. 16/925,946 filed Jul. 10, 2020, which is a continuation of U.S. patent application Ser. No. 16/557,238 filed Aug. 30, 2019, which is a continuation of U.S. patent application Ser. No. 15/810,732 filed Nov. 13, 2017, which is a continuation of U.S. patent application Ser. No. 14/534,781 filed Nov. 6, 2014, now U.S. Pat. No. 9,818,411, which is a continuation of U.S. patent application Ser. No. 13/003,979 filed Jan. 13, 2011, now U.S. Pat. No. 8,903,720, which claims the benefit under 35 U.S.C. Section 371, of PCT International Application No. PCT/KR2009/003855, filed Jul. 14, 2009, which claimed priority to Korean Application No. 10-2008-0068369, filed Jul. 14, 2008, Korean Application No. 10-2008-0134297, filed Dec. 26, 2008, and Korean Application No. 10-2009-0061608, filed Jul. 7, 2009, in the Korean Patent Office, the disclosures of which are hereby incorporated by reference.

TECHNICAL FIELD

The present invention relates to an apparatus for integrally encoding and decoding a speech signal and a audio signal, and more particularly, to a method and apparatus that may include an encoding module and a decoding module, operating in a different structure with respect to a speech signal and a audio signal, and effectively select an internal module according to a characteristic of an input signal to thereby effectively encode the speech signal and the audio signal.

BACKGROUND ART

Speech signals and audio signals have different characteristics. Therefore, speech codecs for speech signal and audio codecs for audio signals have been independently researched using unique characteristics of the speech signals and the audio signals. A current widely used speech codec, for example, an Adaptive Multi-Rate Wideband Plus (AMR-WB+) codec has a Code Excitation Linear Prediction (CELP) structure, and may extract and quantize a speech parameter based on a Linear Predictive Coder (LPC) according to a speech model of a speech. A widely used audio codec, for example, a High-Efficiency Advanced Coding version 2 (HE-AAC V2) codec may optimally quantize a frequency coefficient in a psychological acoustic aspect by considering acoustic characteristics of human beings in a frequency domain.

Accordingly, there is a need for a codec that may integrate a audio signal encoder and a speech signal encoder, and may also select an appropriate encoding scheme according to a signal characteristic and a bitrate to thereby more effectively perform encoding and decoding.

DISCLOSURE OF INVENTION

Technical Goals

An aspect of the present invention provides an apparatus and method for integrally encoding and decoding a speech signal and a audio signal that may effectively select an internal module according to a characteristic of an input signal to thereby provide an excellent sound quality with respect to a speech signal and a audio signal at various bitrates.

Another aspect of the present invention also provides an apparatus and method for integrally encoding and decoding a speech signal and a audio signal that may expand a frequency band prior to a converting a sampling rate to thereby expand the frequency band to a wider band.

Technical Solutions

According to an aspect of the present invention, there is provided an encoding apparatus for integrally encoding a speech signal and a audio signal, the encoding apparatus including: an input signal analyzer to analyze a characteristic of an input signal; a stereo encoder to down mix the input signal to a mono signal when the input signal is a stereo signal, and to extract stereo sound image information from the input signal; a frequency band expander to expand a frequency band of the input signal; a sampling rate converter to convert a sampling rate with respect to an output signal of the frequency band expander; a speech signal encoder to encode the input signal using a speech encoding module when the input signal is a speech characteristics signal; a audio signal encoder to encode the input signal using a audio encoding module when the input signal is a audio characteristic signal; and a bitstream generator to generate a bitstream using an output signal of the speech signal encoder and an output signal of the audio signal encoder.

In this instance, the input signal analyzer may analyze the input signal using at least one of a Zero Crossing Rate (ZCR) of the input signal, a correlation, and energy of a frame unit.

Also, the stereo sound image information may include at least one of a correlation between a left channel and a right channel, and a level difference between the left channel and the right channel.

Also, the frequency band expander may expand the input signal to a high frequency band signal prior to converting of the sampling rate.

Also, the sampling rate converter may convert the sampling rate of the input signal to a sampling rate required by the speech signal encoder or the audio signal encoder.

Also, the sampling rate converter may include: a first down sampler to down sample the input signal by ½; and a second down sampler to down sample an output signal of the first down sampler by ½.

Also, when the input signal is changed between the speech characteristic signal and the audio characteristic signal, the bitstream generator may store, in the bitstream, information associated with compensating for a change of a frame unit. Also, information associated with compensating for the change of the frame unit may include at least one of a time/frequency conversion scheme and a time/frequency conversion size.

According to another aspect of the present invention, there is provided a decoding apparatus for integrally decoding a speech signal and a audio signal, the decoding apparatus including: a bitstream analyzer to analyze an input bitstream signal; a speech signal decoder to decode the bitstream signal using a speech decoding module when the bitstream signal is associated with a speech characteristic signal; a audio signal decoder to decode the bitstream signal using a audio decoding module when the bitstream signal is associated with a audio characteristic signal; a signal compensation unit to compensate for the input bitstream signal when the conversion is performed between the speech characteristic signal and the audio characteristic signal; a sampling rate converter to convert a sampling rate of the bitstream signal; a frequency band expander to generate a high frequency band signal using a decoded low frequency band signal; and a stereo decoder to generate a stereo signal using a stereo expansion parameter.

BRIEF DESCRIPTION OF DRAWINGS

FIG. 3 is a table illustrating a start frequency band and an end frequency band of a frequency band expander according to an embodiment of the present invention;

FIG. 4 is a table illustrating an operation for each module based on a bitrate according to an embodiment of the present invention.

BEST MODE FOR CARRYING OUT THE INVENTION

Figure 1:
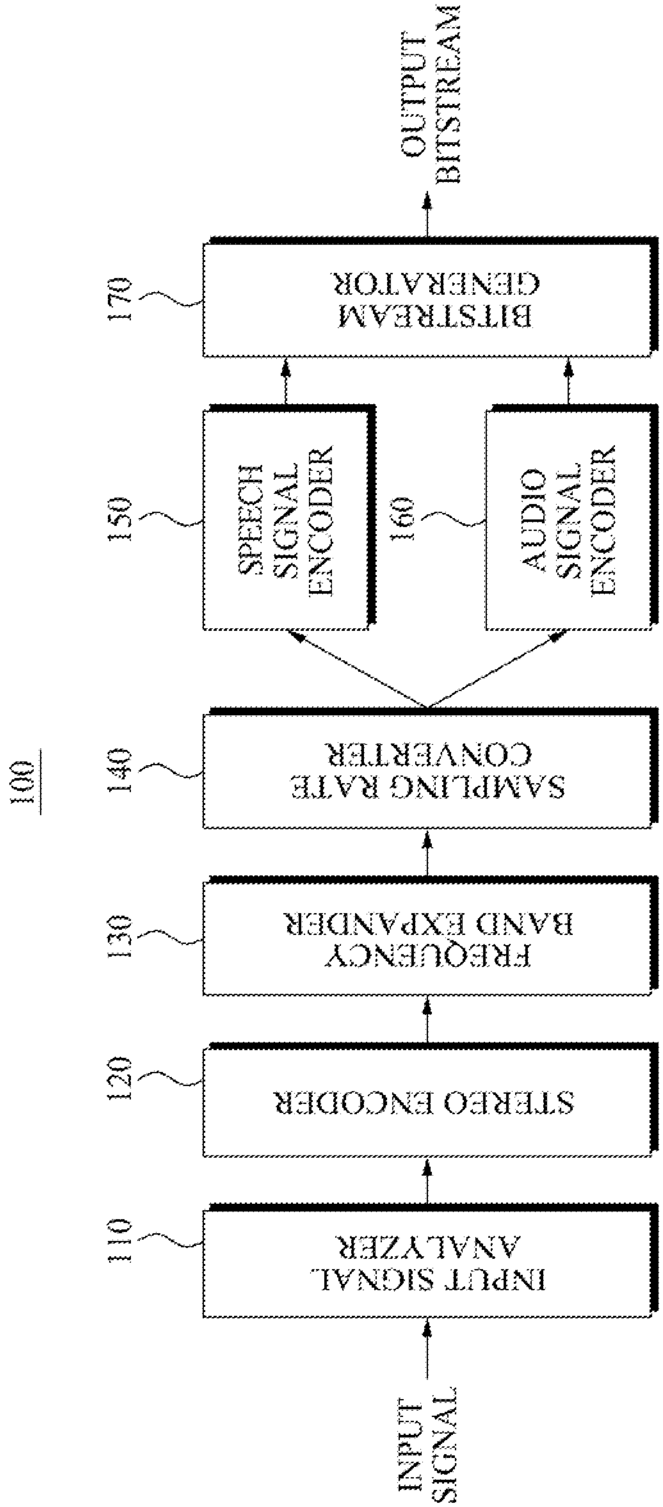
FIG. 1 is a block diagram illustrating an encoding apparatus for integrally encoding a speech signal and a audio signal according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating an encoding apparatus 100 for integrally encoding a speech signal and a audio signal according to an embodiment of the present invention.

Referring to FIG. 1, the encoding apparatus 100 may include an input signal analyzer 110, a stereo encoder 120, a frequency band expander 130, a sampling rate converter 140, a speech signal encoder 150, a audio signal encoder 160, and a bitstream generator 170.

The input signal analyzer 110 may analyze a characteristic of an input signal. Specifically, the input signal analyzer 110 may analyze the characteristic of the input signal to separate the input signal into a speech characteristic signal or a audio characteristic signal. In this instance, the input signal analyzer 110 may analyze the input signal using at least one of a Zero Crossing Rate (ZCR) of the input signal, a correlation, and energy of a frame unit.

The stereo encoder 120 may down mix the input signal to a mono signal, and extract stereo sound image information from the input signal. The stereo sound image information may include at least one of a correlation between a left channel and a right channel, and a level difference between the left channel and the right channel.

The frequency band expander 130 may expand a frequency band of the input signal. The frequency band expander 130 may expand the input signal to a high frequency band signal prior to converting the sampling rate. Hereinafter, an operation of the frequency band expander 130 will be further described in detail with reference to FIG. 3.

FIG. 3 is a table 300 illustrating a start frequency band and an end frequency band of the frequency band expander 130 according to an embodiment of the present invention.

Referring to the table 300, when a mono down-mixed signal is a audio characteristic signal, the frequency band expander 130 may extract information to generate a high frequency band signal according to a bitrate. For example, when a sampling rate of an input audio signal is 48 kHz, a start frequency band of a speech characteristic signal may be fixed to 6 kHz and the same value as a stop frequency band of the audio characteristic signal may be used for a stop frequency band of the speech characteristic signal. Here, the start frequency band of the speech characteristic signal may have various values according to a setting of an encoding module that is used in a speech characteristic signal encoding module. Also, the stop frequency band used in the frequency band expander may be set to various values according to a sampling rate of an input signal or a set bitrate. The frequency band expander 130 may use information such as a tonality, an energy value of a block unit, and the like. Also, information associated with a frequency band expansion varies depending on whether the characteristic signal is for speech or audio. When a conversion is performed between the speech characteristic signal and the audio characteristic signal, information associated with the frequency band expansion may be stored in a bitstream.

Referring again to FIG. 1, the sampling rate converter 140 may convert the sampling rate of the input signal. The above process may correspond to a pre-processing process of the input signal prior to encoding the input signal. Accordingly, in order to change a frequency band of a core band according to an input bitrate, the sampling rate converter 140 may convert the sampling rate of the input audio signal. In this instance, the conversion of the sampling rate may be performed after expanding the frequency band. Through this, the frequency band may be further expanded to a wider band without being fixed to the sampling rate used in the core band.

Hereinafter, the sampling rate converter 140 may be further described in detail with reference to FIG. 2.

Figure 2:
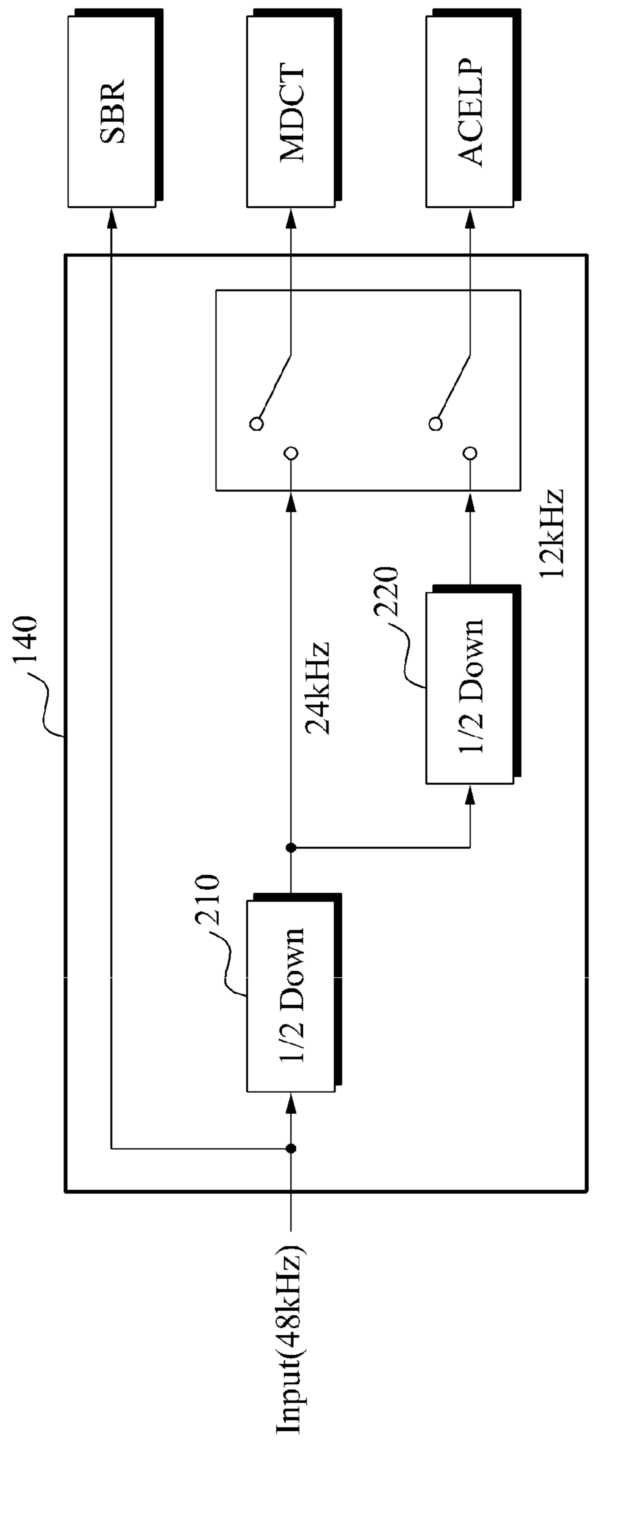
FIG. 2 is a diagram illustrating an example of a sampling rate converter of FIG. 1.

FIG. 2 is a diagram illustrating an example of the sampling rate converter 140 of FIG. 1.

Referring to FIG. 2, the sampling rate converter 140 may include a first down sampler 210 and a second down sampler 220.

The first down sampler 210 may down sample the input signal by ½. For example, when the audio encoding module is an Advanced Audio Coding (AAC)-based encoding module, the first down sampler 210 may perform ½ down sampling.

The second down sampler 220 may down sample an output signal of the first down sampler 210 by ½. For example, when the speech encoding module is an Adaptive Multi-Rate Wideband Plus (AMR-WB+)-based encoding module, the second down sampler 220 may perform ½ down sampling for the output signal of the first down sampler 210.

Accordingly, when the audio signal encoder 160 uses the AAC-based encoding module, the sampling rate converter 140 may generate a ½ down-sampled signal. When the speech signal encoder 150 uses the AMR-WB+-based encoding module, the sampling rate converter 140 may perform ¼ down sampling. Accordingly, the sampling rate converter 140 may be provided before the speech signal encoder 150 and the audio signal encoder 160. Through this, when a sampling rate processed by the speech signal encoding module is different from a sampling rate processed by the audio signal encoding module, the sampling rate may be initially processed by the sampling rate converter 140 and subsequently be input into the speech signal encoding module or the audio signal encoding module.

Also, the sampling rate converter 140 may convert the sampling rate of the input signal to a sampling rate required by the speech signal encoder 150 or the audio signal encoder 160.

Referring again to FIG. 1, when the input signal is a speech characteristic signal, the speech signal encoder 150 may encode the input signal using a speech encoding module. When the input signal is the speech characteristic signal, the speech characteristic signal encoding module may perform encoding for a core band where a frequency band expansion is not performed. The speech signal encoder 150 may use a CELP-based speech encoding module.

When the input signal is a audio characteristic signal, the audio signal encoder 160 may encode the input signal using a audio encoding module. When the input signal is the audio characteristic signal, the audio characteristic signal encoding module may perform encoding for the core band where the frequency band expansion is not performed.

The audio signal encoder 160 may use a time/frequency-based audio encoding module.

The bitstream generator 170 may generate a bitstream using an output signal of the speech signal encoder 150 and an output signal of the audio signal encoder 160. When the input signal is changed between the speech characteristic signal and the audio characteristic signal, the bitstream generator 170 may store, in the bitstream, information associated with compensating for a change of a frame unit. Information associated with compensating for the change of the frame unit may include at least one of a time/frequency conversion scheme and a time/frequency conversion size. Also, a decoder may perform a conversion between a frame of the speech characteristic signal and a frame of the audio characteristic signal using information associated with compensating for the change of the frame unit.

Hereinafter, an operation of the encoding apparatus 100 for integrally encoding the speech signal and the audio signal according to a target bitrate will be described in detail with reference to FIG. 4.

FIG. 4 is a table 400 illustrating an operation for each module based on a bitrate according to an embodiment of the present invention.

Referring to the table 400, when an input signal is a mono signal, all the stereo encoding modules may be set to be off. When a bitrate is set at 12 kbps or 16 kbps, a audio characteristic signal encoding module may be set to be off. The reason of setting the audio characteristic signal encoding module to be off is because encoding a audio characteristic signal using a CELP-based audio encoding module shows an enhanced sound quality in comparison to encoding the audio characteristic signal using a audio encoding module. Accordingly, when the bitrate is set at 12 kbps or 16 kbps, the input mono signal may be encoded using only a speech signal encoding module and a frequency band expansion module after setting the audio encoding module, the stereo encoding module, and an input signal analysis module to be off.

When the bitrate is set at 20 kbps, 24 kbps, or 32 kbps, the speech signal encoding module and a audio signal encoding module may be alternatively adopted depending on whether the input signal is a speech characteristic signal or a audio characteristic signal. Specifically, when the input signal is the speech characteristic signal as an analysis result of the input signal analysis module, the input signal may be encoded using the speech encoding module. When the input signal is the audio characteristic signal, the input signal may be encoded using the audio encoding module.

When the bitrate is set at 64 kbps, a sufficient amount of bits may be available and thus a performance of the audio encoding module based on the time/frequency conversion may be enhanced. Accordingly, when the bitrate is set at 64 kbps, the input signal may be encoded using both the audio encoding module and the frequency band expansion module after setting the speech encoding module and the input signal analysis module to be off.

When the input signal is a stereo signal, a stereo encoding module may be operated. When encoding the input signal at the bitrate of 12 kbps, 16 kbps, or 20 kbps, the input signal may be encoded using the stereo encoding module, the frequency band expansion module, and the speech encoding module after setting the audio encoding module and the input signal analysis module to be off. The stereo encoding module may generally use a bitrate less than 4 kbps. Therefore, when encoding the stereo input signal at 20 kbps, there is a need to encode a mono signal that is down mixed to 16 kbps. In this band, the speech encoding module shows a further enhanced performance than the audio encoding module. Therefore, encoding may be performed for all the input signals using the speech encoding module after setting the input signal analysis module to be off.

When encoding the input stereo signal at the bitrate of 24 kbps or 32 kbps, the speech characteristic signal may be encoded using the speech encoding module and the audio characteristic signal may be encoded using the audio encoding module depending on the analysis result of the input signal analysis module.

When encoding the stereo signal at the bitrate of 64 kbps, large amounts of bits may be available and thus the input signal may be encoded using only the audio characteristic signal encoding module.

For example, when constructing the encoding apparatus 100 using an AMR-WB+-based speech encoder and a High-Efficiency Advanced Coding version 2 (HE-AAC V2)-based audio encoder, the performance of a stereo module and a frequency band expansion module using AMR-WB+ may not be excellent and thus processing of the stereo signal and the frequency band expansion may be performed using a Parametric Stereo (PS) module and a Spectral Band Replication (SBR) module using HE-AAC V2.

Since the performance of CELP-based AMR-WB+ is excellent with respect to a mono signal of 12 kbps or 16 kbps, encoding of the core band may be performed utilizing an Algebraic Code Excited Linear Prediction (ACELP)/Transform Coded Excitation (TCX) module using AMR-WB+. The SBR module using HE-ACC V2 may be utilized for the frequency band expansion.

When the input signal is the speech characteristic signal as an analysis result of the input signal at 20 kbps, 24 kbps, or 32 kbps, the core band may be encoded utilizing an ACEP module and a TCX module using AMR-WB+. When the input signal is the audio characteristic signal, the core band may be encoded utilizing the AAC mode using HE-AAC V2 and the frequency band expansion may be performed utilizing the SBR using HE-AAC V2.

When the bitrate is set at 64 kbps, the core band may be encoded utilizing only the AAC module using HE-AAC V2.

Stereo encoding may be performed for a stereo input utilizing the PS module using HE-AAC V2. Also, the core band may be encoded by selectively utilizing the ACELP module and the TCX module using ARM-WB+ and the ACC module using HE-AAC V2 according to a mode.

As described above, an excellent sound quality may be provided with respect to a speech signal and a audio signal at various bitrates by effectively selecting an internal module based on a characteristic of an input signal. Also, a frequency band may be further expanded to a wider band by expanding the frequency band prior to converting a sampling rate.

Figure 5:
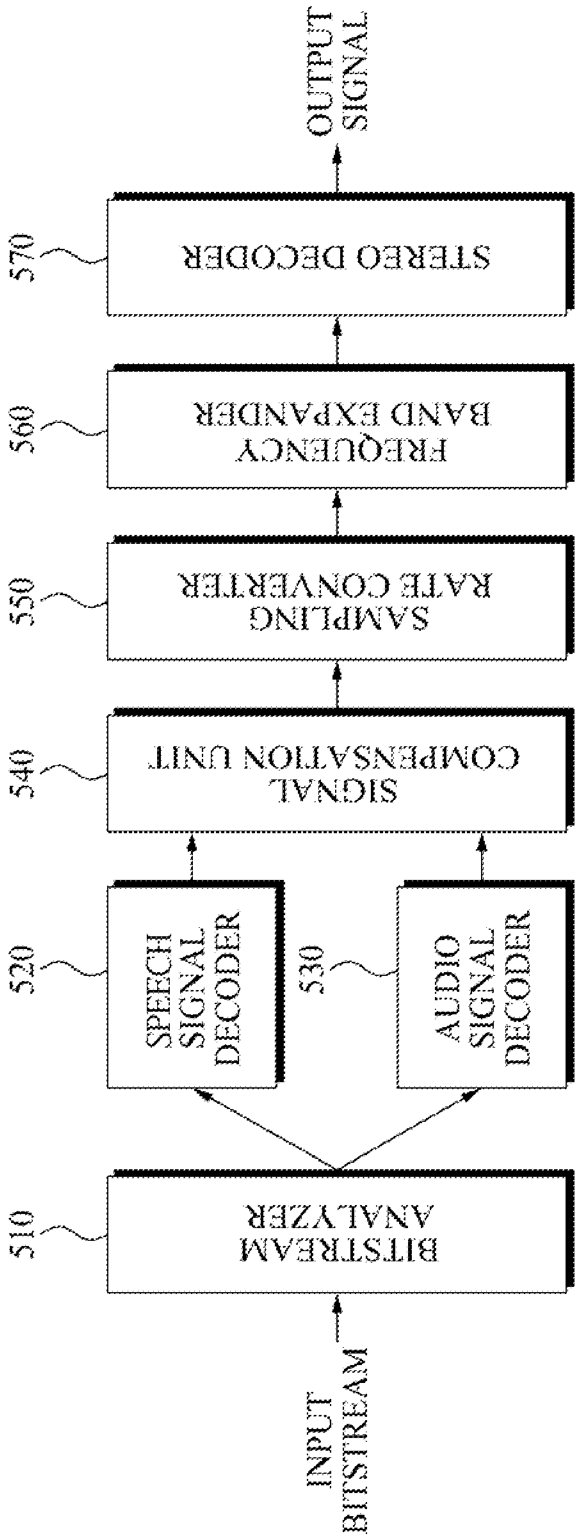
FIG. 5 is a block diagram illustrating a decoding apparatus for integrally decoding a speech signal and a audio signal according to an embodiment of the present invention.

FIG. 5 is a block diagram illustrating a decoding apparatus 500 for integrally decoding a speech signal and a audio signal according to an embodiment of the present invention.

Referring to FIG. 5, the decoding apparatus 500 may include a bitstream analyzer 510, a speech signal decoder 520, a audio signal decoder 530, a signal compensation unit 540, a sampling rate converter 550, a frequency band expander 560, and a stereo decoder 570.

The bitstream analyzer 510 may analyze an input bitstream signal.

When the bitstream signal is associated with a speech characteristic signal, the speech signal decoder 520 may decode the bitstream signal using a speech decoding module.

When the bitstream signal is associated with a audio characteristic signal, the audio signal decoder 530 may decode the bitstream signal using a audio decoding module.

When a conversion is performed between the speech characteristic signal and the audio characteristic signal, the signal compensation unit 540 may compensate for the input bitstream signal. Specifically, when the conversion is performed between the speech characteristic signal and the audio characteristic signal, the signal compensation unit 540 may smoothly process the conversion using conversion information based on each characteristic.

The sampling rate converter 550 may convert a sampling rate of the bitstream signal. Therefore, the sampling rate converter 550 may convert, to an original sampling rate, a sampling rate that is used in a core band to thereby generate a signal to use in a frequency band expansion module or a stereo encoding module. Specifically, the sampling rate converter 550 may generate the signal to use in the frequency band expansion module or the stereo encoding module by re-converting the sampling rate that is used in the core band, to a previous sampling rate.

The frequency band expander 560 may generate a high frequency band signal using a decoded low frequency band signal.

The stereo decoder 570 may generate a stereo signal using a stereo expansion parameter.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An encoding method of an input signal performed by at least one processor, the encoding method comprising:

determining a frame of the input signal whether the frame is a speech frame or an audio frame;

encoding the input signal in a speech encoder based a first coding scheme when the frame is the speech frame, encoding the input signal in an audio encoder based a second coding scheme when the frame is the audio frame; and generating a bitstream including based on a encoded input signal, and wherein the input signal is processed by using information for compensating a change of a frame unit between the speech frame and the audio frame, and wherein the information is included the bitstream, and wherein the input signal is encoded with respect to a core band, wherein the core band is a low frequency band which is not expanded in a frequency band of the input signal.

2. The encoding method of claim 1, wherein the first coding scheme is a CELP coding scheme and the second coding scheme is a MDCT coding scheme.

3. The encoding method of claim 1, wherein a high frequency band is generated from the core band based on a frequency band expander in a decoding process.

4. The encoding method of claim 1, further comprising:

generating information for generating a high frequency band;

wherein the bitstream includes the generated information.

5. The encoding method of claim 4, further comprising:

converting a sampling rate of the input signal to a sampling rate with respect to a core band of the input signal.

6. The encoding method of claim 4, further comprising:

down-sampling a sampling rate of the input signal by one half (½).

7. The encoding method of claim 4, further comprising:

down-sampling a sampling rate of the input signal by one quarter (¼).

8. The encoding method of claim 1, further comprising:

converting a sampling rate of the input signal to a sampling rate for encoding a core band of the input signal.

9. The encoding method of claim 1, wherein the information for compensating at least one change between the speech frame and the audio frame includes an encoded portion of the speech frame of the input signal for decoding the audio frame of the input signal.

10. A decoding method for an encoded input signal performed by at least one processor, the decoding method comprising:

receiving a bitstream included the input signal;

determining whether a frame of the input signal is a speech frame or an audio frame;

decoding a core band of the input signal by:

decoding the core band of the input signal in a speech decoder based on a first coding scheme when the frame is the speech frame, decoding the core band of the input signal in an audio decoder based on a second coding scheme when the frame is the audio frame, and processing the input signal using information for compensating a change of a frame unit between the speech frame and the audio frame, and wherein the information is included the bitstream, and wherein the input signal is decoded with respect to a core band, wherein the core band is a low frequency band which is not expanded in a frequency band of the input signal.

11. The decoding method of claim 10, wherein the first coding scheme is a CELP coding scheme and the second coding scheme is a MDCT coding scheme.

12. The decoding method of claim 11, further comprising:

expanding a frequency band of the input signal by generating a high frequency band from the core band of the input signal.

13. The decoding method of claim 11, wherein the input signal is compensated using information for compensating at least one change between the speech frame and the audio frame.

14. The decoding method of claim 13, wherein the information includes an encoded portion of the speech frame of the input signal for decoding the audio frame of the input signal.

15. The decoding method of claim 10, further comprising: generating a stereo signal from the input signal having an expanded frequency band.

16. The decoding method of claim 15, wherein a sampling rate for a SBR is twice the sampling rate for the decoding a core band of the input signal.

17. The decoding method of claim 15, wherein a sampling rate for a SBR is fourfold the sampling rate for the decoding a core band of the input signal.

18. The decoding method of claim 10, further comprising: converting a sampling rate of the decoded input signal based on a sampling rate for the decoding the core band.

* * * * *